May 5, 1970 P. J. BROSENS ETAL 3,509,867
RADIANT AND CONVECTIVE HEATER
Filed Dec. 29, 1967 3 Sheets-Sheet 1
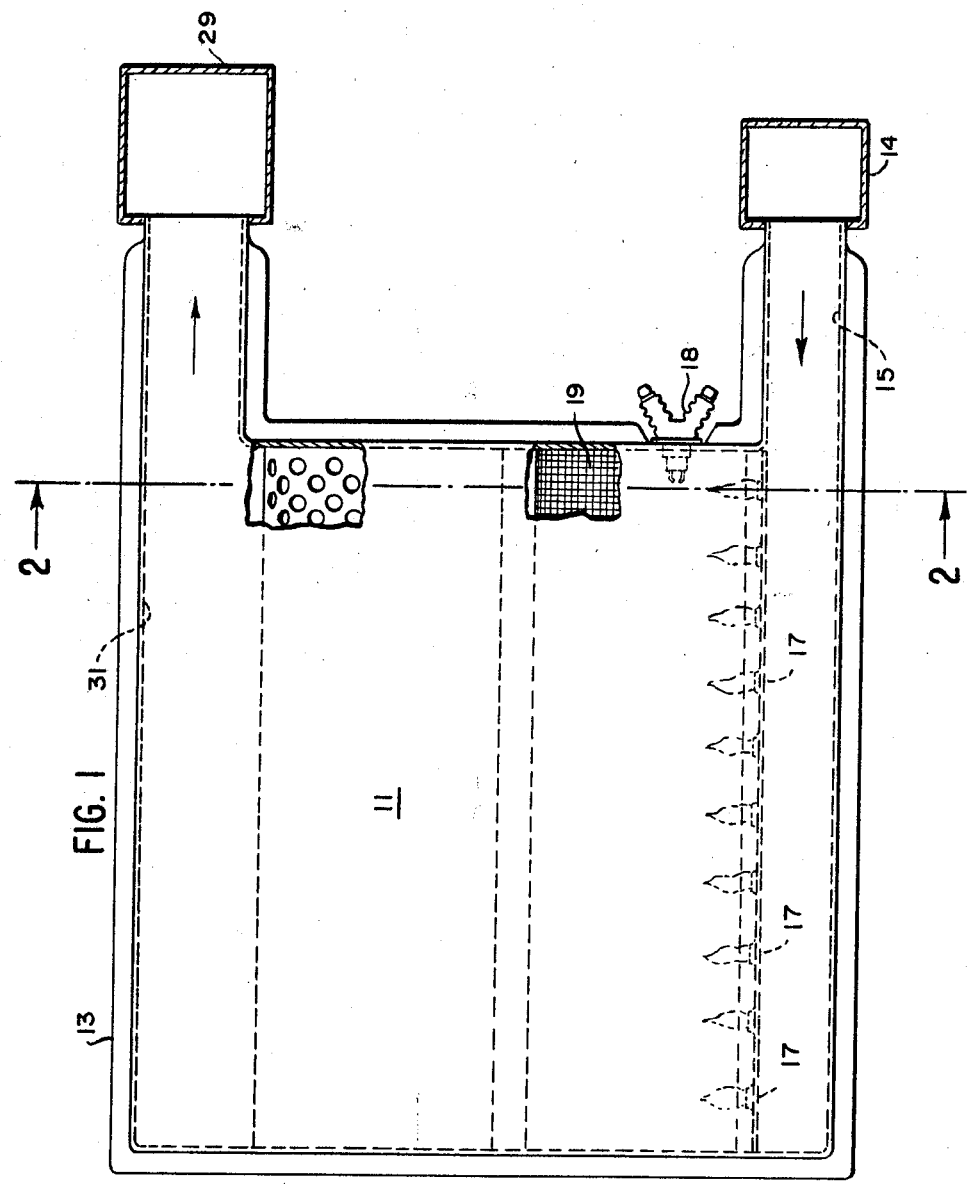
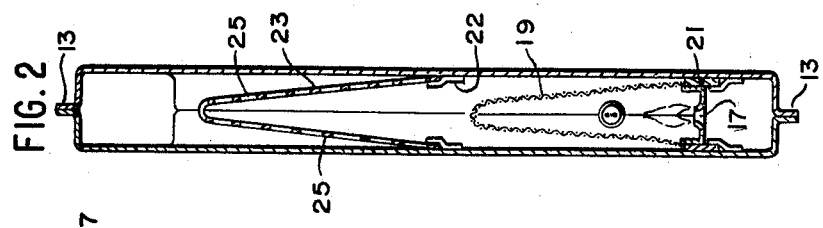
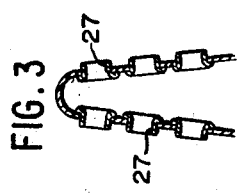
INVENTORS
PIERRE J. BROSENS
DOV Z. GLUCKSMAN
BY
*Kenway, Jenney + Hildreth*
ATTORNEYS

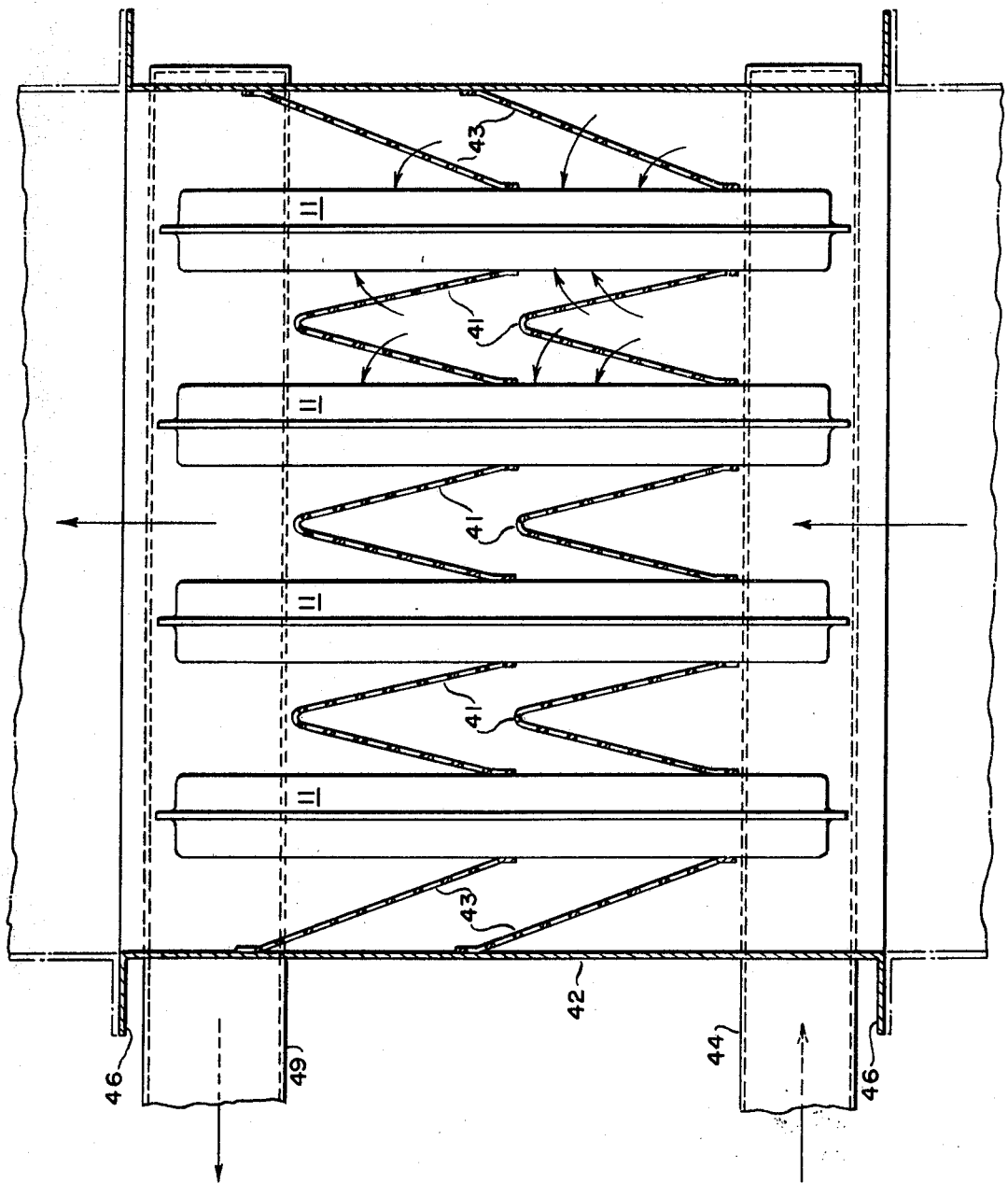

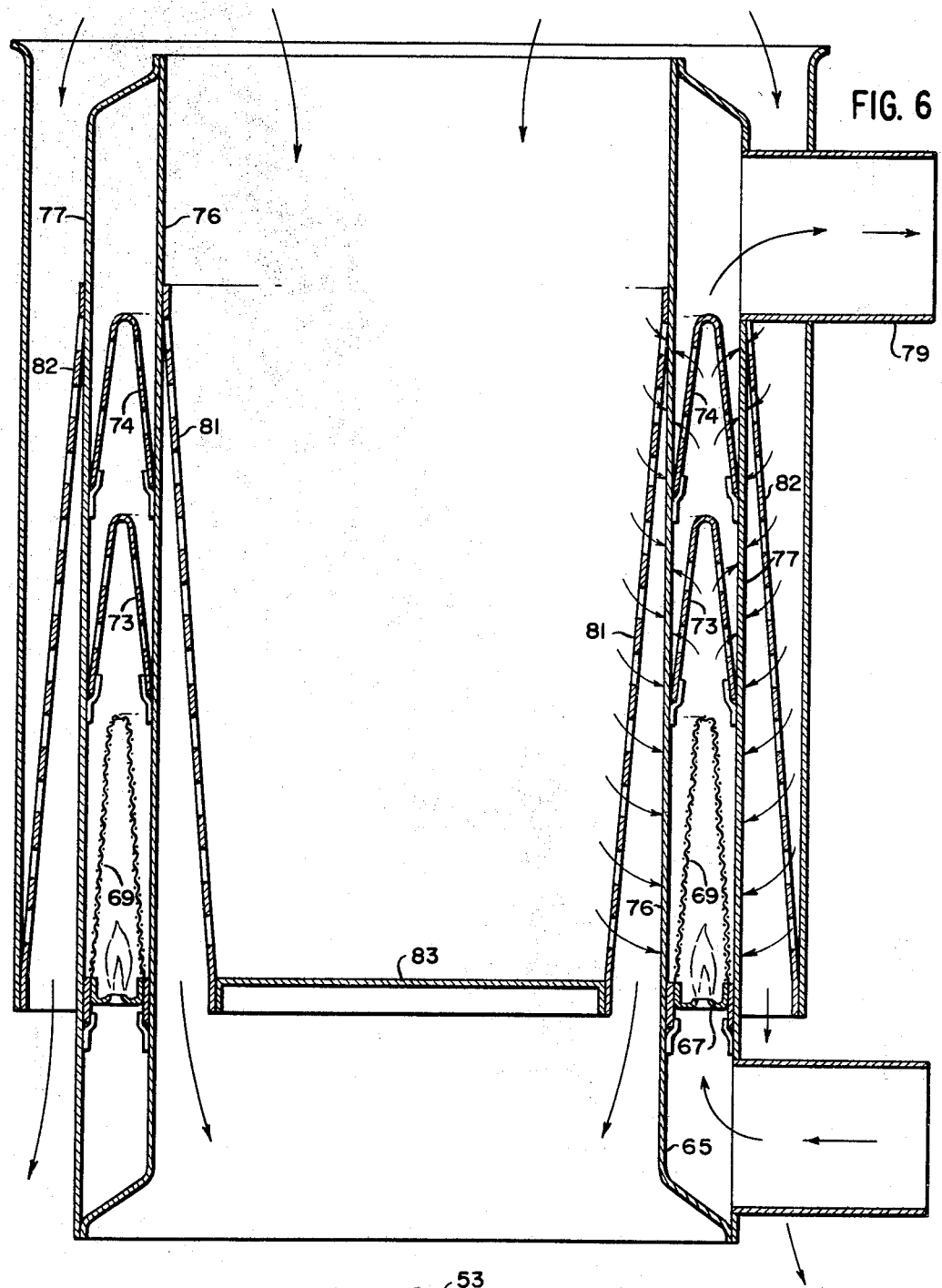

United States Patent Office 3,509,867
Patented May 5, 1970

3,509,867
RADIANT AND CONVECTIVE HEATER
Pierre J. Brosens, Belmont, and Dov Z. Glucksman, West Newton, Mass., assignors to Thermo Electron Corporation, Waltham, Mass., a corporation of Massachusetts
Filed Dec. 29, 1967, Ser. No. 694,744
Int. Cl. F24h 3/00; F24c 3/00, 15/28
U.S. Cl. 126—116                                    14 Claims

ABSTRACT OF THE DISCLOSURE

A heater including one or more sealed, internal burner, heating modules. The internal burner is of the radiant type integrated with a jet impingement heat transfer mechanism for efficiently and uniformly heating the module walls. External heat exchangers, also of the jet impingement type, provide efficient extraction of heat from the module walls such that the burner may be operated with a fuel-mix of near-stoichiometric proportions.

The sealed modules may be used individually, in parallel, or in series and, because only connections for fuel mixture input and flue gas output are needed, immersion of the module or modules in liquid or explosive environments is feasible.

---

Generally, the invention relates to a compact, inexpensive, heater composed of sealed modules. By reason of its geometry, size, cost and efficiency, the heater has applications ranging from domestic furnaces to industrial process pipelines. Moreover, because of its sealed modular structure, the heater may be immersed and operated in environments of a liquid or even explosive nature.

The approach to the design of compact and inexpensive heaters has followed traditional paths. Heaters are basically made up of two components, a burner and a heat exchanger and each component has been improved and developed more or less separately. It has, of course, been recognized that any heat exchanger utilized must extract heat at such a rate that elements of the burner with which it is associated will not themselves become overheated. This has been the main factor determining the types of burner and heat exchanger that might be mated in a heater, and the separate paths of development have not led to compact or inexpensive structures.

One irksome problem in achieving a compact structure is the maintenance of combustion over a large area to minimize temperatures. Larger surfaces for combustion may avoid localized overheating but, at the same time, they add to the size and complexity of the heating element. Of course, the minimization of temperatures is also desirable to permit the use of low-cost materials in a heater.

Still another problem in home heating installations as well as in other environments where quiet operation is required is the uncomfortably loud noise caused by products of combustion within the enclosure for the heating element. This is especially true where the enclosure is actually a duct of the heating system which tends to amplify the noise. The present invention is concerned with overcoming the problems noted and, accordingly a principal object of the present invention is a quiet, compact, inexpensive, easily fabricated and efficient heating system.

A further object of the present invention is a sealed, heating module capable of use individually, in parallel or in series in a wide variety of environments.

A still further object of the present invention is an integral burner and heat exchanger.

Another object of the present invention is a flexible and controllable heating system.

Still another object of the present invention is the improvement of heat transfer within and from a sealed heating module.

A principal feature of the present invention is the incorporation of a burner substantially within a heat exchanging element rather than the customary practice of fabricating units separately and mating them together. Stated otherwise, a burner and a heat exchanging element have been integrated to form a sealed heating module.

The integration of the burner and heat exchanging element within the sealed module permits a highly efficient transfer of heat from the products of combustion to the module wall and a further exchanging element enhances the transfer of heat from the module wall to, for example, a fluid in which the module may be disposed. Low-cost materials may be employed throughout because the rapid transfer of heat obviates the need for high-temperature resistant materials.

To achieve the integrated structure, a modified radiant-type burner is employed. The radiant portion of the burner is an inverted V-shaped element which is mounted adjacent the bottom of a sealed module. A fuel mixture is supplied to the burner at its wide end at which combustion takes place. Heat radiates from the burner to the walls of the module and the hot gases emanating from the burner also transfer heat to the wall of the enclosure by convection, the operation of the burner thus being both radiant and convective. The hot gases, however, on leaving the burner encounter one or more inverted V-shaped heat exchanging units which are disposed in alignment with the radiant element. A number of openings are formed in the flat surfaces of the heat exchanging unit and shaped nozzles may be inserted in the openings. The hot gases flowing from the burner pass into the interior of the V-shaped heat exchanging unit and are directed through the openings or nozzles to impinge as jets upon the heat transfer wall of the enclosure. A flue connection is made to the enclosure external to and downstream of the heat exchanging element or elements. Thus, the input mixture is supplied at one end of the module and the flue gases are extracted from the other end of the module.

The total module may be of any of several geometries and of any convenient height to fit conventional ducts, pipelines or other enclosures. Moreover, as many modules as required to produce a given quantity of heat may be placed in parallel or in series. Where more than one module is employed the input fuel may be supplied through a combustion mixture manifold to the modules and the flue gases may be similarly extracted through a flue gas manifold.

Heat transfer may be further enhanced as when one or more modules are enclosed in a system through which the medium to be heated flows. Jet impingement baffles similar to that within each module may be placed in such a manner that the medium is caused to impinge as jets upon the exterior surface of the heated module walls. Thus, efficient heat transfer from combustion gases and radiation to the module wall and thence to the medium to be heated is achieved.

For a better understanding of the present invention together with other and further objects, features and advantages reference should be made to the following specification of a preferred embodiment of the invention which should be read in conjunction with the appended drawings in which:

FIG. 1 is a side view partly cut away, of one of the integrated burner-heat exchanger modules of the invention;

FIG. 2 is a cross-section of the element illustrated in FIG. 2 taken along the lines 2—2;

FIG. 3 is a fragmentary view of a jet impingement baffle in which nozzles have been installed;

FIG. 4 illustrates a heater made up of a plurality of modules and incorporated in a heating system.

FIG. 5 illustrates detail of a spark igniter; and

FIG. 6 is a sectional view of a cylindrical version of an integrated burner-heat exchanger.

FIGS. 1 and 2 illustrate one of the sealed integrated burner-heat exchanger modules 11. The walls of the sealed module may be formed by conventional sheet metal operations, peripheral flanges 13 on each of two similar members being welded together to form the desired enclosure. Although it is often unnecessary, the lower portion of the enclosure as seen in FIG. 1 may be embossed to accommodate differential thermal expansions.

At the lower right corner, as seen in FIG. 1, an input manifold 14 for the introduction of a fuel mixture is shown. The manifold communicates by means of a feed line with a series of burner nozzles 17 set in openings spaced along the length of the upper surface of the feed line within the enclosure.

Disposed above the burner nozzles 17 and sealed through the enclosure is a spark igniter 18, further detail on which is given below. Other ignition systems such as a glow coil or a pilot may be used, but the spark igniter is presently preferred. A radiant member 19, which may be a mesh of any convenient aspect ratio, but which is preferably in the form of an inverted V extends upwardly from and encloses the burner nozzles 17. The radiant member 19 may be mounted in any convenient fashion within the module, such as by means of the brackets 21 shown in FIG. 2. When such a mesh radiant screen is utilized, combustion of the fuel mix can be made to take place entirely within the radiant screen. As is well known in the art, the conductivity of the screen may be so chosen as to assure maintenance of combustion within the screen where that is desirable.

Alternatively, the radiant member may be made of porous, sintered metal or of a porous ceramic composition such as that disclosed in U.S. Pat. Nos. 3,179,156 and 3,191,659 to Weiss et al. and Weiss, respectively. In these circumstances, combustion takes place near the outer surface of the radiant member.

Above the radiant screen 19 and supported in any suitable fashion such as by the brackets 22, is a jet impingement baffle 23. Formed in the jet impingement baffle 23 is a plurality of openings 25 through which hot gases from the radiant screen burner are directed against the inner surface of the module walls. In some instances as shown in FIG. 3, it is desirable to provide nozzles 27 inserted in the orifice 25 to enhance the formation of jets to impinge upon the interior wall of the module. The jets are thus better defined and the shaped nozzles reduce pressure drop as well as preventing the jet from being deflected sideways. The efficiency of heat transfer and the mechanics of breaking up stagnant surface layers by the jet impingement process are disclosed in co-pending application Ser. No. 446,476, "Heat Exchangers" filed Mar. 29, 1965 now Pat. No. 3,416,011, issued Dec. 10, 1968 and assigned to the assignee of this application.

Above the jet impingement baffle there is shown a flue gas manifold 29 which is in communication with an exhaust line 31. As is obvious, the entire module 11 is completely sealed except for the input feed line 15 and the output exhaust line 31. The radiant burner and jet impingement baffle are completely enclosed in the sealed structure. The radiant burner may include a screen so designed as to act as a first-stage jet impingement baffle in that the hot gases are directed to some extent against the interior wall of the module adding to that which is radiated from the radiant member. Thus, both radiative and convective heat transfer are obtained. Also, where conditions permit and greater heat transfer is desired, one or more additional jet impingement baffles may be added downstream of the baffle 23.

Most important, however, the burner is submerged in and literally integrated with the heat exchanging jet impingement baffle 23 within the sealed module. The nesting of the radiant element within the heat transfer element leads to a very compact package, with highly efficient heat transfer. Finally, the geometry of the module is such that it lends itself to use either in series, or in parallel as described hereinbelow.

A typical module is capable of producing 25,000 B.t.u./hr. and measures only about 10″ x 10″ x 1″, accepting a mixture of gas and air at the inlet and discharging combustion gases at approximately 550° F. despite the amount of heat generated and extracted.

The radiant member, running the width of the module has a length of only 10″ and its screen runs at a temperature of about 1800° F. However, tests have shown that the burner operates efficiently over a range of 40% to 150% of capacity. Therefore, an excellent "turndown" ratio exists, permitting adjustment in accordance with desired heat output.

In FIG. 4 there is shown a portion of a heating system incorporating an enclosure 42 which may be a conventional section of duct work made of heavy sheet metal. Flanges 46 at the top and at the bottom of the enclosure facilitate its incorporation into a duct of the heating system such as suggested in outline. As may be seen in the drawing, both the bottom and the top of the enclosure 42 are open to permit the passage of a fluid medium such as air.

Coming from the left and at the rear of the enclosure 42 there may be seen an input manifold 44 from which a plurality of input mixture feed lines communicate with the various modules 11 mounted within the structure 42. In similar but reverse fashion, flue gases from the various sealed modules are conveyed by means of flue gas connectors to a flue gas manifold 49 for removal. A spark ignitor (not shown) is provided for each module.

As is indicated by the arrows, air flows through the duct system and the enclosure 42 from bottom to top. As the air flows through the enclosure 42, it passes through jet impingement baffles such as the baffles 41 and 43 to impinge upon the exterior heat transfer walls of adjacent sealed modules. Several sets of impingement baffles 41 in the form of inverted V's are installed in the area between adjacent modules and diagonal baffles 43 are installed between the end module walls and the walls of the enclosure 42.

The path of air within the enclosure 42 is influenced in the manner indicated by the curved arrows. Multiple openings are formed in each of the baffles to cause the air to impinge upon the heated outer walls of the sealed modules. The jet impingement of the air upon the module walls permits highly efficient heat extraction, the jets of air serving to break up stagnant boundary layers which would otherwise accumulate along the outer surfaces of the walls of the burners. The removal of the stagnant layers along the walls enhances the transfer of heat from those walls to the impinging air jets. The same air which serves the jet impingement process continues through the duct work system as the heat conveying medium, of course.

In a heating system for domestic heating purposes built in accordance with the disclosure of FIG. 4, for each module, 185 c.f.m. of room air has been raised in temperature by 100° F. with an accompanying pressure drop of 0.65 in. of water. Noise of combustion products striking walls is minimal because that action takes place deep within the modules where it is muffled. Furthermore, the large areas of sheet metal encountered in conventional heating systems are not present in designs based upon the present invention, so a primary noise factor is eliminated.

The heating capabilities of the illustrated system are surprisingly high for a compact structure. A 100,000 B.t.u./hr. system needs be no larger than 10″ x 10″ x 10″. Heat exchanging surfaces remain below 1000° F. and flue gases are at relatively low temperature because of the efficient extraction of the generated heat.

In FIG. 5, detail of the spark igniter 18 may be found. The igniter includes a mounting flange 51 designed to be welded into the wall of each module 11. Within the flange 51 an insulating member 52 which may be of ceramic or other temperature resistant material is sealed. Dual leads 53 and 54 pass through the insulating member and terminate in a spark gap 55 which is disposed above the burner nozzles 17 and within the radiant member 19. The opposite ends of the leads 53 and 54 may be provided with suitable electrical terminals 56 and 57. In the event that a radiant member of the type disclosed in the above-mentioned patents to Weiss et al. is employed, the igniter would be adjacent the outer surface of the radiant member.

FIG. 6 illustrates a cylindrical version of the module of the invention. It may best be understood by considering the appearance that a module 11 would have if it were generally annular rather than linear. The burner nozzles 67 are, of course, in a ring compared to the straight line of the module 11. The feed line 65 is also annular rather than straight as in the case of the line 15, as are the radiant member 69 and internal apertured jet impingement heat exchange baffles 73 and 74. In this instance a double-baffle arrangement is employed, although either only a single baffle or baffles in excess of two may be used. All of these elements are sealed in the annular region defined by the concentric sleeves 76 and 77. As the jet impingement arrows indicate, hot gases from the ring burner impinge upon both the inner cylindrical wall 76 and the outer cylindrical wall 77 which enclose the burner heat exchanger elements. Flue gases emerge from the outlet 79 which communicates with the volume within the walls 76 and 77 above the heat-exchanger elements.

The fluid to be heated, as indicated by the longer arrows passes downwardly through the annulus formed by the wall 77 and an outer enclosing wall 80 as well as through the center of the module. A conically tapered apertured baffle 81 causes that fluid to be jetted against the inner surface of the wall 76 and a similar, though reverse tapered apertured baffle 82 jets the fluid against the outer surface of the wall 77 to enhance heat transfer. In order that all of the fluid will be so directed, the internally extending baffle 81 is terminated in a solid disk 83 which prevents fluid from bypassing the jetting apertures. Of course, suitable nozzles may be employed to control jet formation in the baffles 73, 74, 81 and 82. These nozzles may be substantially similar to those shown in FIG. 3.

An igniter, such as the spark igniter of FIG. 5 may be sealed through the concentric walls 80 and 77 to initiate burner operation. As with the module 11, however, other ignition systems are feasible. As in the case of the rectangular version of the invention shown in the FIGS. 1–4, the cylindrical or concentric sleeve version of FIG. 6 employs both convective and radiant heat transfer and is generally based upon similar principles.

Numerous applications for the invention exist because of its utilization of low-cost materials, its compactness and its adaptability to various geometries. Heating for industrial process pipe lines, for circulation systems in swimming pools and for a wide range of immersion applications presently limited to electric heating are all possible.

Therefore, the invention should not be limited to the details of the required preferred embodiments disclosed above, but only by the spirit and scope of the appended claims.

What is claimed is:

1. A burner module comprising a sealed enclosure in which only first and second openings are formed, means communicating with said first opening for introducing a fuel mix into said sealed enclosure, means including a first porous element for burning said fuel mix within said sealed enclosure, to produce heat and products of combustion, said products of combustion impinging upon at least a first portion of said sealed enclosure, a second porous member disposed in alignment with said first porous member, said products of combustion also passing through said second porous member to impinge upon at least a second portion of said sealed enclosure, means communicating with said second opening for extracting products of combustion from said sealed enclosure, and means for extracting heat through said enclosure.

2. A burner module as defined in claim 1 wherein said second porous member comprises at least one jet impingement baffle through which said products of combustion pass to impinge upon inner surfaces of said sealed enclosure.

3. A burner module as defined in claim 1 wherein said first porous member comprises an element of the radiant type.

4. A burner module as defined in claim 3 wherein said sealed enclosure is heated by convection from the jet impingement thereof of products of combustion from said second porous member and by products of combustion and radiation from said element of the radiant type.

5. A burner module as defined in claim 3 wherein said radiant member is composed of a porous refractory material from which said products of combustion emerge.

6. A burner module as defined in claim 4 wherein said means for burning said fuel mix includes an element communicating with said first opening and having a plurality of openings formed therein, said element being disposed within said radiant member.

7. A burner module as defined in claim 6 wherein said sealed enclosure is relatively wide, relatively high and relatively thin, said burner element being disposed at the bottom of said enclosure and running substantially the width thereof, said radiant member having the shape of an inverted V, the wide end of said V enclosing said burner element, and contacting the front and rear surfaces of said enclosure along the width thereof, said jet impingement baffle comprising a perforated element also having the shape of an inverted V, said baffle being aligned and coextensive with said radiant member, the wide end of said baffle being adjacent the narrow end of said radiant member.

8. A heater comprising at least a sealed burner module as defined in claim 3, a second jet impingement heat exchanging baffle disposed externally of and adjacent the outer surface of said enclosure, and means for directing a heat conveying fluid medium through said second jet impingement heat exchanging baffle against the outer surface of said enclosure.

9. A heater comprising a first plurality of sealed burner modules of the type defined in claim 3, second jet impingement heat exchanging baffles disposed adjacent said modules and means for directing a heat conveying fluid medium through said second jet impingement heat exchanging baffles against the outer surfaces of said enclosures.

10. A heater as defined in claim 9 wherein said sealed burner modules of the type defined in claim 3 are disposed in parallel array and certain of said second jet impingement heat exchanging baffles are in the shape of inverted V's, the wide ends of said V's extending between the outer surfaces of adjacent modules, said heat conveying fluid medium being directed through said second jet impingement heat exchanging baffles against said outer surfaces of said modules.

11. A heater comprising a plurality of concentric sleeves, the innermost and next innermost sleeves defining an annular region, a ring burner sealed in said region adjacent one end thereof, means for introducing a fuel-mix to said burner for combustion, a generally circular radiant member having a cross-section in the form of an inverted V sealed in said region above and generally enclosing said burner, at least one generally circular heat-exchanging baffle also having a cross-section in the form of an inverted V sealed in said region above and in alignment with said radiant member, a flue gas outlet connected to said region above said baffle, said baffle having apertures formed therein to cause products of combustion from said burner to impinge as jets upon said sleeves defining said region, and means including an outer sleeve for passing fluid within said innermost sleeve and external to said next innermost sleeve, to effect the transfer of heat to said fluid by radiant and convective means.

12. A heater as defined in claim 11 wherein said last-mentioned means further comprises baffles having apertures formed therein for forming said fluid into jets impinging upon the sleeves defining said annular region.

13. A burner module as defined in claim 4 wherein said means for burning said fuel mix comprises said fuel mix comprises a member of porous refractory material through which said fuel mix passes and on which combustion of said fuel mix takes place.

14. A burner module as defined in claim 13 wherein said member of porous refractory material is generally circular and has a cross-section in the form of an inverted V.

References Cited

UNITED STATES PATENTS

| | | | |
|---|---|---|---|
| 1,635,379 | 7/1927 | Miller | 126—116 |
| 1,735,945 | 11/1929 | Wollaston | 110—97 |
| 1,755,727 | 4/1930 | Cramer | 126—116 |
| 1,862,219 | 6/1932 | Harrison. | |
| 3,124,193 | 3/1964 | Klein | 431—264 |
| 3,187,798 | 6/1965 | Pokorny | 431—264 |
| 3,357,471 | 12/1967 | Lyczko. | |

FOREIGN PATENTS 942,360   9/1948   France.

EDWARD G. FAVORS, Primary Examiner

U.S. Cl. X.R.

110—97; 126—83, 91; 431—329